(12) United States Patent
Vogel-Martin et al.

(10) Patent No.: US 9,878,954 B2
(45) Date of Patent: Jan. 30, 2018

(54) VACUUM GLAZING PILLARS FOR INSULATED GLASS UNITS

(71) Applicant: 3M INNOVATIVE PROPERTIES COMPANY, St. Paul, MN (US)

(72) Inventors: Margaret M. Vogel-Martin, Forest Lake, MN (US); Martin B. Wolk, Woodbury, MN (US); Michael Benton Free, Saint Paul, MN (US); Olester Benson, Jr., Woodbury, MN (US); Evan L. Schwartz, Vadnais Heights, MN (US); Robert F. Kamrath, Mahtomedi, MN (US); Brant U. Kolb, Afton, MN (US); Kathleen M. Humpal, Stillwater, MN (US); Mark J. Hendrickson, Minneapolis, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 552 days.

(21) Appl. No.: 14/025,958

(22) Filed: Sep. 13, 2013

(65) Prior Publication Data

US 2015/0079313 A1 Mar. 19, 2015

(51) Int. Cl.
*E06B 3/66* (2006.01)
*C04B 35/486* (2006.01)
(Continued)

(52) U.S. Cl.
CPC .......... *C04B 35/486* (2013.01); *E06B 3/6612* (2013.01); *E06B 3/66304* (2013.01); *C04B 35/00* (2013.01); *C04B 2235/3217* (2013.01); *C04B 2235/3225* (2013.01); *C04B 2235/3227* (2013.01); *Y02B 80/24* (2013.01);
(Continued)

(58) Field of Classification Search
CPC .............. E06B 3/6612; E06B 3/66304; Y10T 428/24479; Y10T 428/24612; Y10T 428/252; C04B 35/00
See application file for complete search history.

(56) References Cited

U.S. PATENT DOCUMENTS 4,772,511 A 9/1988 Wood et al.
4,956,205 A * 9/1990 Enomoto .............. C04B 41/009
184/109
(Continued)

FOREIGN PATENT DOCUMENTS

EP 293163 11/1988
JP 2002104875 4/2002
(Continued)

OTHER PUBLICATIONS

Collins, "Current Status of the Science and Technology of Vacuum Glazing," Solar Energy, 1998, vol. 62, No. 3, pp. 189-213.
(Continued)

*Primary Examiner* — Donald J Loney

(57) ABSTRACT

Vacuum insulated glass units having layered pillars. The glass units include two glass panes and an edge seal between the glass panes with a substantial vacuum gap between them. A plurality of pillars are located between the glass panes as spacers to maintain the vacuum gap. The pillars have a sintered ceramic, alpha alumina, or zirconia body with a tapered sidewall and a functional layer on a surface of the body.

9 Claims, 11 Drawing Sheets

(51) Int. Cl.
*E06B 3/663* (2006.01)
*C04B 35/00* (2006.01)

(52) U.S. Cl.
CPC .............. *Y10T 428/24479* (2015.01); *Y10T 428/24612* (2015.01); *Y10T 428/252* (2015.01)

(56) References Cited

U.S. PATENT DOCUMENTS

| | | | |
|---|---|---|---|
| 5,017,532 A | 5/1991 | Sonnenberg et al. | |
| 5,124,185 A | 6/1992 | Kerr | |
| 5,201,916 A | 4/1993 | Berg et al. | |
| 5,657,607 A | 8/1997 | Collins | |
| 5,789,041 A * | 8/1998 | Franzen | C23C 14/22 427/248.1 |
| 5,891,536 A * | 4/1999 | Collins | B32B 17/10055 428/120 |
| 5,902,652 A | 5/1999 | Collins et al. | |
| 6,121,177 A | 9/2000 | Guigonis | |
| 6,261,652 B1 | 7/2001 | Poix | |
| 6,326,067 B1 * | 12/2001 | Veerasamy | E06B 3/6612 428/120 |
| 6,372,312 B1 | 4/2002 | Aggas | |
| 6,387,460 B1 | 5/2002 | Shukuri | |
| 6,452,749 B1 | 9/2002 | Ota | |
| 6,479,112 B1 * | 11/2002 | Shukuri | E06B 3/6612 156/109 |
| 6,497,931 B1 | 12/2002 | Aggas | |
| 6,946,171 B1 | 9/2005 | Aggas | |
| 8,013,345 B2 * | 9/2011 | Barnes | F21V 7/0091 106/287.16 |
| 8,679,599 B2 | 3/2014 | Grzybowski | |
| 8,853,112 B2 | 10/2014 | Nonnet et al. | |
| 2010/0107525 A1 | 5/2010 | Grzybowski et al. | |
| 2010/0260950 A1 | 10/2010 | Tang | |
| 2012/0088045 A1 | 4/2012 | Veerasamy | |
| 2013/0142972 A1 | 6/2013 | Raggio | |

FOREIGN PATENT DOCUMENTS

| | | |
|---|---|---|
| WO | WO 2011/082022 | 7/2011 |
| WO | WO 2013-055432 | 4/2013 |

OTHER PUBLICATIONS

Collins, "Measurement of local heat flow in flat evacuated glazing" Int. J. Heat Mass Transfer, 1993, vol. 36, No. 10, pp. 2553-2563.
Eames, "Vacuum Glazing: Current performance and future prospects" Vacuum, 2008, vol. 82, pp. 717-722.
Wilson, "Heat Conduction Through the Support Pillars in Vacuum Glazing," Solar Energy, 1998, vol. 63, No. 6, pp. 393-406.
Kocer, "Vacuum Insulating Glazing Part I," 7 pages, http://www.glassonweb.com/articles/article/816/, Sep. 2012.
Wang et al., "Synthesis of crack-free monolithic $ZrO_2$ aerogel modified by $SiO_2$," J. Porous Mater., vol. 21, Nov. 15, 2013, pp. 127-130.
PCT International Search Report for PCT/US2014/053976, dated Dec. 12, 2014.

* cited by examiner

VACUUM GLAZING PILLARS FOR INSULATED GLASS UNITS

BACKGROUND

Windows are poor thermal insulators and contribute significantly to building heat loss and energy inefficiency. The need to meet green building standards is driving the adoption of energy efficient insulated glass units including vacuum designs. A vacuum insulated glass unit 10 is shown in FIGS. 1 and 2. Unit 10 includes two panes of glass 11 and 12 separated by a vacuum gap. Pillars 14 in the gap maintain the separation of glass panes 11 and 12, which are hermetically sealed together by an edge seal 13, typically a low melting point glass frit. Manufacturing vacuum insulated glass units efficiently and cost effectively can present challenges, particularly with selection of suitable pillars, placement of the pillars, and sealing the glass panes together with the vacuum gap. Accordingly, a need exists for improved pillars for vacuum insulated glass units and methods to make them.

SUMMARY

Vacuum insulated glass units having layered pillars, consistent with the present invention, include two glass panes and an edge seal between the glass panes with a substantial vacuum gap between them. A plurality of pillars is located between the first and second glass panes. The pillars have a body with an optional functional layer or coating.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments of the present invention include discrete pillars formed in part via a replication process that are suitable for use in vacuum insulated glass units. Pillar materials include ceramics and nanoparticle filled polymer composites. The pillars can be incorporated into vacuum insulated glass units using pick and place technology (mechanical transfer such as robotics), delivery films, and lamination transfer films.

Examples of delivery films for vacuum insulated glass units are described in U.S. Patent Application of M. B. Free et al., entitled "Vacuum Glazing Pillars Delivery Films and Methods for Insulated Glass Units," and filed on same date herewith, which is incorporated herein by reference as if fully set forth. Examples of lamination transfer films are described in U.S. patent application Ser. No. 13/553,987, entitled "Structured Lamination Transfer Films and Methods," and filed Jul. 20, 2012, which is incorporated herein by reference as if fully set forth.

Pillars for Vacuum Glazing

Figure 1:
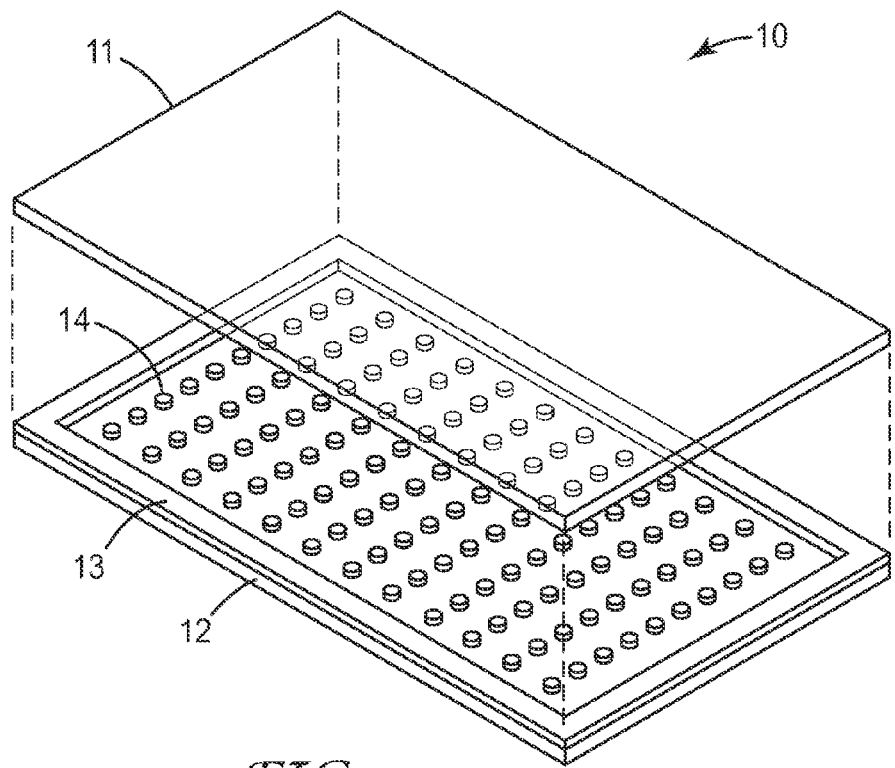
FIG. 1 is an exploded perspective view of a vacuum insulated glass unit.
Figure 2:
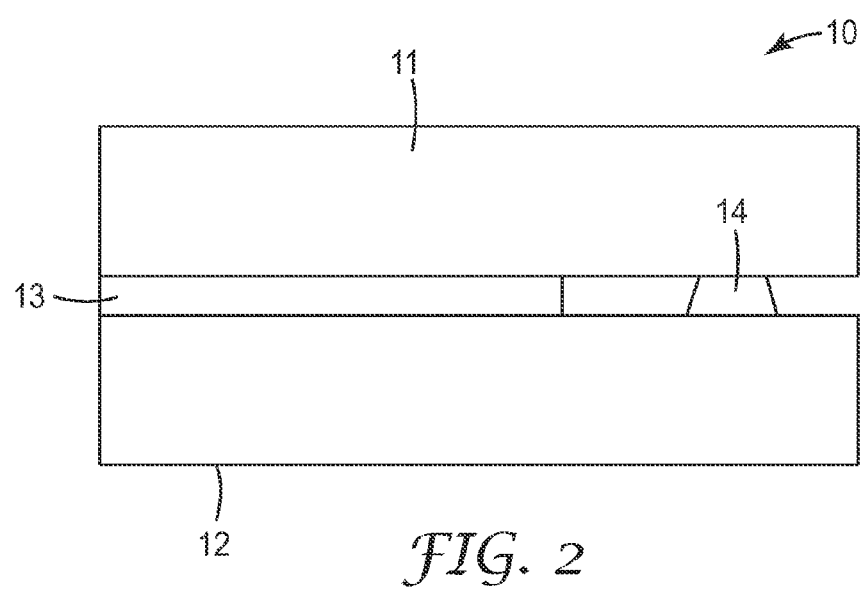
FIG. 2 is a side sectional view of a vacuum insulated glass unit.

High strength pillars are discrete precision molded or replicated parts with a deterministic shape and are used in vacuum insulated glass units as illustrated in FIGS. 1 and 2. The pillars function as spacers to maintain the separation of glass panes and at least a substantial vacuum gap within an insulated glass unit. As shown, the glass panes are typically substantially co-extensive with one another to make a complete insulated glass unit. The pillars can be permanently adhered to the panes of glass and optionally include a coating to allow for some movement of the panes with respect to each other. Pillars are composed of a pillar body and one or more of the following optional layers: a binder (permanent, fugitive, or both); a high strength planarization layer; a compliant layer; an adhesive layer; an orientation layer; a frit glass coating; an antistatic coating; a low coefficient of friction (COF) layer; a low thermal conductivity layer; a metal layer; and a diamond-like glass (DLG) layer. These optional layers can be implemented as coatings, for example.

Pillars are preferably disk-like with a diameter (largest dimension) of about 600 μm or less and a thickness of about 100 μm to 200 μm. Alternatively, pillars can have a diameter (largest dimension) of less than 1000 μm, or 800 μm, or 600 μm, or 400 μm, or 200 μm, or 100 μm. Pillars must be stable to vacuum glazing fabrication conditions, including high temperature edge frit sealing (~400° C.). They typically must also withstand years of use in exterior window applications in a number of environments and therefore require significant photo-, mechanical, and thermal stability.

The pillar body is a shaped ceramic or composite part with preferably compressive strength on the order of greater than 400 MPa, or 600 MPa, or 800 MPa, or 1 GPa, or 2 GPa, and a thermal conductivity of less than about 40 W m$^{-2\circ}$ K$^{-1}$, more preferably less than 20 W m$^{-2\circ}$ K$^{-1}$, and most preferably less than 10 W m$^{-2\circ}$ K$^{-1}$. In some embodiments, the pillar body comprises a ceramic, such as alpha alumina, and is fabricated via the molding of a sol gel precursor (the "sol gel route"). In other embodiments, the pillar body comprises a thermal or radiation cured composite made from thermally stable acrylate monomers or oligomers, or both, and a nanoparticle filler such as nanozirconia (the "cast and cure route"). Materials for the pillar body include the following: ceramic nanoparticles ($Al_2O_3$, $SiO_2$, $ZrO_2$, SiC, $Si_3N_4$, and combinations thereof); ceramic precursors such as SSQ and polysilazanes; sintered ceramic ($Al_2O_3$, $SiO_2$, $ZrO_2$, SiC, $Si_3N_4$, and the like); glass ceramic (the MACOR product, LAS-system, MAS-system, ZAS-system); glass frit; glass beads or glass bubbles; metal; and combinations thereof.

Ceramics are often opaque in appearance due to the scattering of light by pores in the ceramic. In order to achieve even a limited level of translucency, the density of the ceramic is typically greater than 99% of theoretical. Higher clarity can require levels above 99.9% or even 99.99%. Two methods known in the art for achieving very high densities in ceramic materials are hot isostatic pressing and spark plasma sintering. However the equipment required for these methods is relatively expensive, requires protective atmospheres and/or the graphite dies used in this equipment can lead to discoloration of the ceramic by chemical reduction (loss of oxygen from the metal oxide).

One embodiment of the present invention, provides a crack-free, crystalline metal oxide article having x, y, and z dimensions equal to or less than 600 μm and a density of at least 98.5 (in some embodiments, 99, 99.5, 99.9, or even at least 99.99) percent of theoretical density, wherein at least 70 mole percent of the crystalline metal oxide is $ZrO_2$, wherein from 1 to 15 mole percent (in some embodiments 1 to 9 mole percent) of the crystalline metal oxide is $Y_2O_3$, and wherein the $ZrO_2$ has an average grain size in a range from 75 nanometers to 400 nanometers. In calculating the theoretical density, the volume of unit cell is measured by XRD for each composition or calculated via ionic radii and crystal type.
Where
N=number of atoms in unit cell;
A=Atomic Weight [kg mol'];
V=Volume of unit cell [m3]; and
N=Avogadro's number [atoms mol'].

Figure 3A:
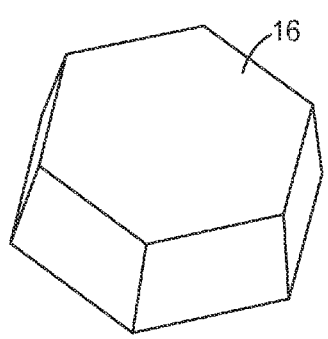
FIGS. 3A-3H are diagrams of exemplary pillar body geometries.
Figure 3B:
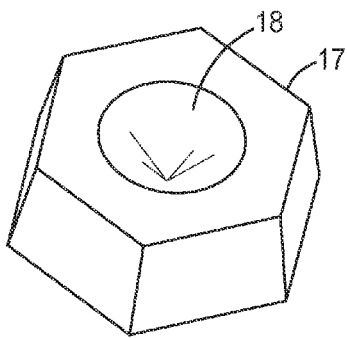
Figure 3C:
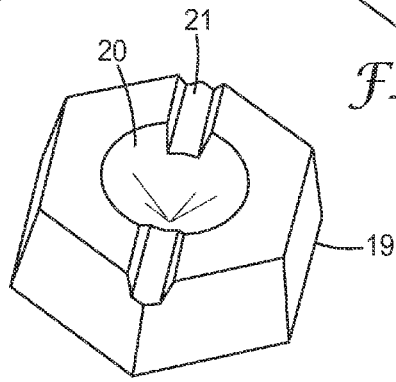
Figure 3D:
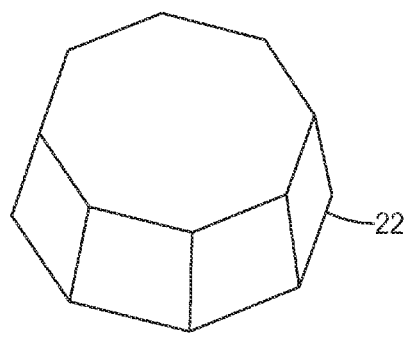
Figure 3E:
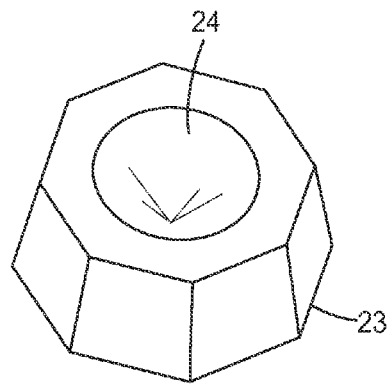
Figure 3F:
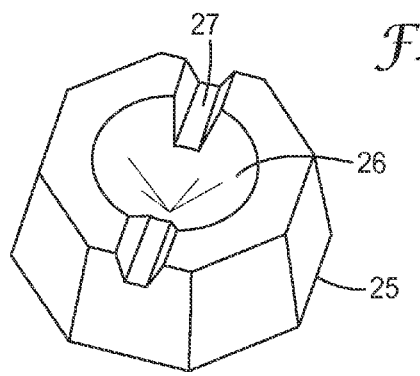
Figure 3G:
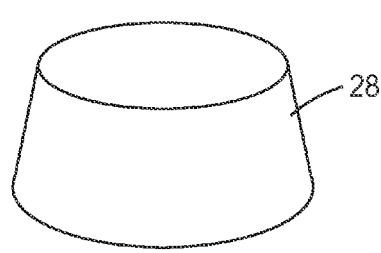
Figure 3H:
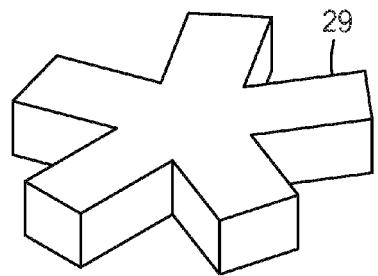

The pillar body can be fabricated by a molding process. The shape of the body is determined by the mold used in the fabrication process and preferably has a hexagonal or octagonal shape for the sidewalls, as illustrated in FIGS. 3A-3F. The body also has surfaces between the sidewalls for placement against the glass panes of a vacuum insulated glass unit. The following are exemplary pillar shapes. A pillar 16 has a tapered hexagonal shape (FIG. 3A). A pillar 17 has a tapered hexagonal shape with an indentation 18 (FIG. 3B). A pillar 19 has a tapered hexagonal shape with an indentation 20 and a notch 21 (FIG. 3C). A pillar 22 has a tapered octagonal shape (FIG. 3D). A pillar 23 has a tapered octagonal shape with an indentation 24 (FIG. 3E). A pillar 25 has a tapered octagonal shape with an indentation 26 and a notch 27 (FIG. 3F). A pillar 28 has a tapered round disk shape (FIG. 3G). A pillar 29 has a tapered shape with shaped sidewalls (FIG. 3H). Other shapes are possible such as a 12-sided body and non-tapered shapes.

Figure 3I:
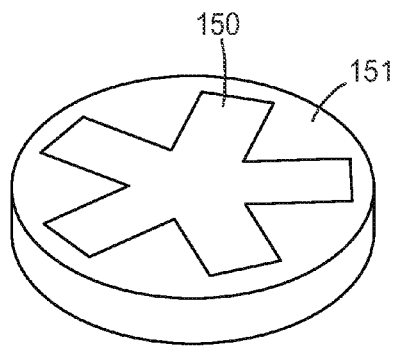
FIGS. 3I-K are diagrams of exemplary pillar body geometries with functional coatings.
Figure 3J:
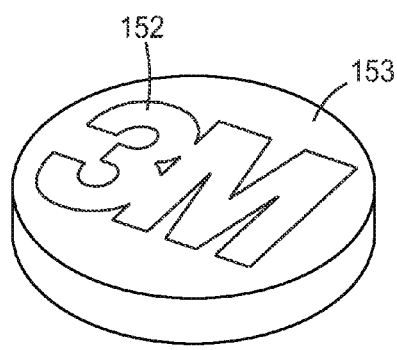
Figure 3K:
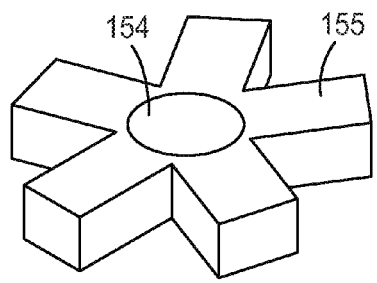

Also, the pillar bodies can contain functional coatings, as illustrated by the exemplary pillars in FIGS. 3I-3K. A sintered ceramic body 150 includes a functional coating 151 (FIG. 3I). A sintered ceramic body 152 includes a functional coating 153 (FIG. 3J). A sintered ceramic body 154 includes a functional coating 155 (FIG. 3K).

Figure 3L:
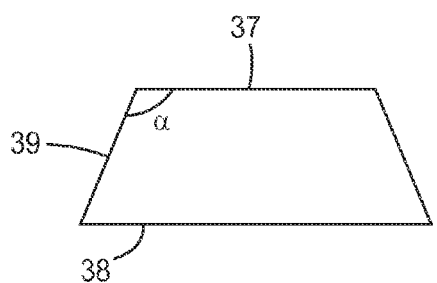
FIG. 3L is a diagram illustrating a draft angle in pillars.

The pillar sidewalls are sloped or tapered, as illustrated in FIGS. 3A-H, by design in order to improve mold release. As shown in FIG. 3L illustrating a side view of a pillar, a draft angle α between a face 37 (having a smaller area than opposite surface 38) and a sloping sidewall 39 can be varied to change the relative sizes of each face 37 and 38. In various embodiments, the draft angle α can be between approximately 95° to approximately 130°, or between about 95° to about 125°, or between about 95° to about 120°, or between about 95° to about 115°, or between about 95° to about 110°, or between about 95° to about 105°, or between about 95° to about 100°.

Figure 4:
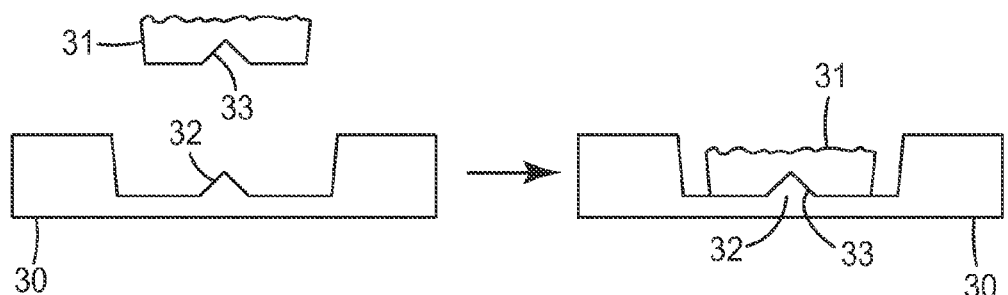
FIG. 4 is a diagram illustrating mechanical orientation of pillars in a mold.

The body can have a central indentation, as illustrated in FIGS. 3B, 3C, 3E, and 3F, to improve uniformity during drying of the sol gel ceramic precursor, to improve bonding of the planarization material, or to facilitate mechanical differentiation of the two major surfaces during a coating, sorting, or positioning process. For example, FIG. 4 illustrates a mold 30 having a protrusion 32 that mates with an indentation 33 on a pillar 31. If the body has a central indention, it can also have one or more notches in the outermost surface of the indented side, as illustrated in FIGS. 3C and 3F, to aid in venting during depressurization and to reduce drying-induced stress. The central indentation need not be centrally located on the pillar body but, rather, is within the central area of the pillar body.

Pillars may be monolithic or composite. Composite pillars may comprise a high compressive strength sintered ceramic core and one or more functional layers. Alternately, composite pillars may comprise a thermally stable organic, inorganic, or hybrid polymeric binder and an inorganic nanoparticle filler.

Figure 5A:
FIG. 5A is a side sectional view of an ideal pillar body shape.
Figure 5B:
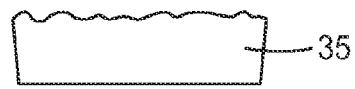
FIG. 5B is a side sectional view of a pillar body with roughness.
Figure 5C:
FIG. 5C is a side sectional view of a body shape with roughness and warp.

Monolithic pillar bodies can be made via the sol gel route. This process involves molding of gel bodies on a continuous belt, drying, demolding, and sintering. This process may yield bodies with some asymmetry. Surfaces in contact with the mold during the fabrication side may be smoother than the surface with an air interface. In addition, samples may warp or cup slightly during drying to form a pillar with a concave air side and a convex mold side. For example, FIG. 5A illustrates a pillar body 34 having an ideal cross sectional shape, FIG. 5B illustrates a pillar body 35 having roughness, and FIG. 5C illustrates a pillar body 36 having roughness and warp. Using higher solids content sols and slower drying processes results in reduced cupping due to drying shrinkage. The materials and process parameters are optimized to compensate for the differential shrinkage as well as to keep the pillars flat. Optimal conditions for producing sol-gel pillar bodies may produce discrete pillars that are suitable for use in vacuum insulated glazing without further modification.

A modified sol-gel process involving densification of an aerogel intermediate has been shown to greatly improve fidelity and minimize cupping or distortion during the drying process.

In an optional step, it may be desired to introduce the modifying additive by an impregnation process. A water-soluble salt can be introduced by impregnation into the pores of the calcined, pillar bodies. Then the pillar bodies are prefixed again. This option is further described in European Patent Application Publication No. 293,163. The pillar bodies were calcined at approximately 650 degrees Celsius and then saturated with a mixed nitrate solution of the following concentration (reported as oxides): 1.8% each of MgO, $Y_2O_3$, $Nd_2O_3$ and $La_2O_3$. The excess nitrate solution was removed and the saturated pillar bodies with openings were allowed to dry after which the pillar bodies were again calcined at 650 degrees Celsius and sintered at approximately 1400 degrees Celsius. Both the calcining and sintering was performed using rotary tube kilns.

Composite pillars based on nanoparticle filled polymers can be cast as pastes into a mold. The pastes comprise a thermal or radiation cured composite binder formulation and inorganic nanoparticles.

The binder formulation may be based on thermally stable organic, inorganic, or hybrid polymers. These materials are typically dimensionally stable upon exposures to temperatures up to 350° C. Preferably, the binder material has a low thermal conductivity, which would reduce the transfer of heat from the exterior through to the interior window pane.

Thermally stable organic polymeric binder components may be selected, but are not limited to, materials from the following group: polyimide, polyamide, polyphenylene, polyphenylene oxide, polyaramide (e.g., the KEVLAR product from Dupont), polysulfone, polysulfide, polybenzimidazoles, and polycarbonate. One exemplary polymer that may be used is the ULTEM product (polyetherimide) manufactured by SABIC Innovative Plastics. Another exemplary material is an imide-extended bismaleimide such as BMI-1700, available from Designer Molecules (San Diego, Calif.), which can be melt-processed at low temperatures and then cured to form a crosslinked polyimide network.

The polymeric binder may include thermally stable inorganic, siloxane, or hybrid polymeric species. These materials are typically dimensionally stable upon exposures to temperatures up to 350° C. Amorphous organopolysiloxane networks, a chemical bond network derived from condensation of organosiloxane precursors, is an example of a suitable thermally stable polymeric binder. Silsesquioxanes or polysilsesquioxanes are derived from fundamental molecular units that have silicon coordinated with three bridging oxygen atoms. Because of this, silsesquoxanes can form a wide variety of complex three-dimensional shapes. Various polysilsesquioxanes can be used, for example, polymethylsilsesquioxane, polyoctylsilsesquioxane, polyphenylsilsesquioxane and polyvinylsilsesquioxane. Suitable specific polysilsesquioxanes include, but are not limited to, acrylopoly oligomeric silsesquioxane (Catalog # MA0736) from Hybrid Plastics of Hattiesburg, Miss.; polymethylsilsesquioxane from Techneglas of Columbus, Ohio and sold under the label GR653L, GR654L, and GR650F; polyphenylsilsesquioxane from Techneglas of Columbus, Ohio and sold under the label GR950F; and polymethylphenylsilsesquioxane from Techneglas of Columbus, Ohio and sold under the label GR9O8F.

The polymeric binder may also comprise other alkoxysilanes, such as tetraalkoxysilanes and alkyltrialkoxysilanes having the formula: (R')x Si—(OR2)y wherein R' may be an alkyl, alkylaryl, arylalkyl, aryl, alcohol, polyglycol, or polyether group, or a combination or mixture thereof; R2 may be an alkyl, acetoxy, or a methoxyethoxy group, or a mixture thereof, x=from 0 to 3 and y=from 4 to 1 respectively, with the proviso that x+y=4. The one or more alkoxysilanes including mono-, di-, tri-, and tetraalkoxysilanes may be added to control the crosslink density of the organosiloxane network and control the physical properties of the organosiloxane network including flexibility and adhesion promotion. Examples of such alkoxysilanes include, but are not limited to, tetraethoxysilane, tetramethoxysilane, methyltriethoxysilane, and methyltrimethoxysilane. Such ingredients may be present in an amount of about 0 to 50 weight percent.

The nanoparticles may comprise silica, zirconia, titania, alumina, clay, metals, or other inorganic materials. The loading of the nanoparticles is typically greater than 50 vol %.

A compliant planarization layer is one example of a functional layer that may be coated as a layer or a enveloping coating around a high compressive strength sintered ceramic pillar body and is a thermally stable crosslinked nanocomposite that serves to flatten and smooth one or both of the major pillar body surfaces. The planarization layer may also allow for a slight compression of the pillar during the fabrication of an insulated glass unit and thus reduce the likelihood of glass crack initiation or propagation upon evacuation to reduced pressure or to other environmental impacts. The planarization layer comprises an organic, inorganic, or hybrid polymeric binder and an optional inorganic nanoparticle filler The polymeric binder may include thermally stable organic polymeric species. These materials are typically dimensionally stable upon exposures to temperatures up to 350° C. Preferably, the binder material has a low thermal conductivity, which would reduce the transfer of heat from the exterior through to the interior window pane.

Thermally stable organic polymeric component may be selected, but are not limited to, materials from the following group: polyimide, polyamide, polyphenylene, polyphenylene oxide, polyaramide (e.g., the KEVLAR product from Dupont), polysulfone, polysulfide, polybenzimidazoles, and polycarbonate. One exemplary polymer that may be used is the ULTEM product (polyetherimide) manufactured by SABIC Innovative Plastics. Another exemplary material is an imide-extended bismaleimide such as BMI-1700, available from Designer Molecules (San Diego, Calif.), which can be melt-processed at low temperatures and then cured to form a crosslinked polyimide network.

The compliant layer polymeric binder may include thermally stable inorganic, siloxane, or hybrid polymeric species. These materials are typically dimensionally stable upon exposures to temperatures up to 350° C. Amorphous organopolysiloxane networks, a chemical bond network derived from condensation of organosiloxane precursors, is an example of a suitable thermally stable polymeric binder. Silsesquioxanes or polysilsesquioxanes are derived from fundamental molecular units that have silicon coordinated with three bridging oxygen atoms. Because of this, silsesquoxanes can form a wide variety of complex three-dimensional shapes. Various polysilsesquioxanes can be used, for example, polymethylsilsesquioxane, polyoctylsilsesquioxane, polyphenylsilsesquioxane and polyvinylsilsesquioxane. Suitable specific polysilsesquioxanes include, but are not limited to, acrylopoly oligomeric silsesquioxane (Catalog # MA0736) from Hybrid Plastics of Hattiesburg, Miss.; polymethylsilsesquioxane from Techneglas of Columbus, Ohio and sold under the label GR653L, GR654L, and GR650F; polyphenylsilsesquioxane from Techneglas of Columbus, Ohio and sold under the label GR950F; and polymethylphenylsilsesquioxane from Techneglas of Columbus, Ohio and sold under the label GR9O8F.

The compliant layer polymeric binder may also comprise other alkoxysilanes, such as tetraalkoxysilanes and alkyltrialkoxysilanes having the formula: (R')x Si—(OR2)y wherein R' may be an alkyl, alkylaryl, arylalkyl, aryl, alcohol, polyglycol, or polyether group, or a combination or mixture thereof; R2 may be an alkyl, acetoxy, or a methoxyethoxy group, or a mixture thereof, x=from 0 to 3 and y=from 4 to 1 respectively, with the proviso that x+y=4. The one or more alkoxysilanes including mono-, di-, tri-, and tetraalkoxysilanes may be added to control the crosslink density of the organosiloxane network and control the physical properties of the organosiloxane network including flexibility and adhesion promotion. Examples of such alkoxysilanes include, but are not limited to, tetraethoxysilane, tetramethoxysilane, methyltriethoxysilane, and methyltrimethoxysilane. Such ingredients may be present in an amount of about 0 to 50 weight percent.

A planarizing process for composite pillars can be carried out by thermal or radiation curing of the planarization material on one or both major surfaces of a pillar body while it is between two flat surfaces. The composition may be identical to that of the composite pillars. The planarization layer can have either adhesive or lubricant characteristic.

The compliant adhesive layer comprises a thermal or radiation sensitive silsesquioxane, a photoinitiator, and a nanoparticle filler. The material can be crosslinked photochemically and then heated to initiate condensation of the silanol groups of the silsesquioxane, forming a durable, thermally stable material. In addition to providing adhesion between the pillar and one of the glass panes, the adhesive layer can be used to set the final pillar height and define (minimize) the pillar height variation.

The orientation layer is a material applied to a pillar body while it is still in the mold. The orientation can be on the mold side or the air side. The function of the orientation layer is to physically or chemically differentiate the mold and air sides during placement of the pillars on a surface. The orientation layer can be electrically conductive or statically dissipative, ferromagnetic, ionic, hydrophobic, or hydrophilic.

The frit glass coating is a dispersion of low melting glass microparticles in a sacrificial binder that is applied uniformly to the exterior of the pillar body. During the vacuum insulated glass unit assembly process, the sacrificial binder is thermally decomposed and the frit glass flows to form an adhesive bond to one or both of the glass panes. Sacrificial polymers such as, for example, nitrocellulose, ethyl cellulose, alkylene polycarbonates, [meth]acrylates, and polynorbonenes can be used as binders.

The low COF layer may be a thermally stable material that promotes slip between the pillar body and a flat surface (e.g., one of the inner glass surfaces in a vacuum insulated glass unit). The layer may comprise a monolayer of fluorosilanes, a fluorinated nanoparticle filled polyimide (e.g., Corin XLS, NeXolve, Huntsville, Ala.), a thin coating of a low surface energy polymer (e.g., PVDF or PTFE), a diamond-like carbon (DLC) layer, or a lamellar layer comprising graphite, or other thermally stable lubricant materials.

Composite Pillar Configurations

Six basic configuration types of high strength pillars are described, as shown in FIGS. 6A-6F. Each configuration can further comprise additional layers and coatings such as those listed above.

Figure 6A:
FIG. 6A is a side sectional view of a pillar first embodiment.

FIG. 6A is a side sectional view of a pillar first embodiment, composed of a high strength monolithic pillar 40. The pillar body is a highly filled nanocomposite comprising an inorganic nanopowder (e.g., silica, zirconia, alumina, titania, clay, or silver) and a thermally stable binder. The fabrication process results in a pillar body with smooth planar major surfaces.

Figure 6B:
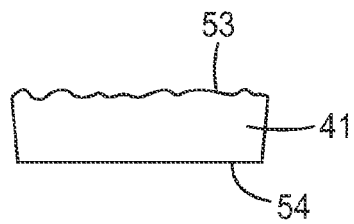
FIG. 6B is a side sectional view of a pillar second embodiment.

FIG. 6B is a side sectional view of a pillar second embodiment, composed of a sintered ceramic pillar body 41. The pillar body is a sintered ceramic with a smooth mold-side surface 54 and an air-side surface 53. In some embodiments, the pillar molding process may produce with smooth air side and mold side surfaces. In other embodiments, the process may lead to pillars with smooth mold side and rough air side surfaces. Smooth surfaces are defined as those having an average roughness ($R_a$) of less than 1 micron. The roughness on the air side surface may require planarization if the asperities have a height of greater than 10 microns, 5 microns, or 1 micron. The sidewalls can have a draft angle of between 90° and 130°.

Figure 6C:
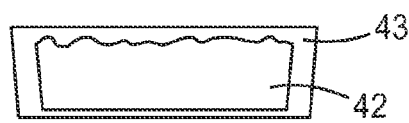
FIG. 6C is a side sectional view of a pillar third embodiment.

FIG. 6C is a side sectional view of a pillar third embodiment, composed of ceramic pillar body 42 encased in a planarization material 43. The pillar body is the same as or similar to pillar 41 and is fully encased within a thermally stable composite coating. The major surfaces of the composite coating are smooth and planar, even though the pillar body may be rough or warped.

Figure 6D:
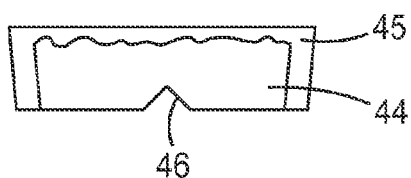
FIG. 6D is a side sectional view of a pillar fourth embodiment.

FIG. 6D is a side sectional view of a pillar fourth embodiment, composed of a ceramic pillar body 44 with ceramic and composite major surfaces. The pillar body has a conical indentation 46 to enable orientation of the pillar during its fabrication. This orientation allows the top surface to be planarized with a composite material 45, resulting in one major surface of ceramic and the other of composite. Both surfaces are smooth and planar.

Figure 6E:
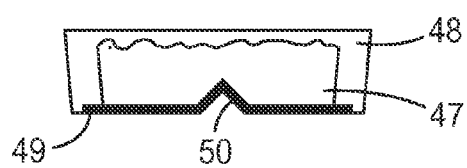
FIG. 6E is a side sectional view of a pillar fifth embodiment.

FIG. 6E is a side sectional view of a pillar fifth embodiment, composed of a ceramic pillar body 47 with coated and composite major surfaces. The pillar body has a conical indentation 50 to enable orientation of the pillar during its fabrication. As described below, the placement mold is pre-coated before receiving the sintered ceramic pillar, allowing the top surface to be planarized with a composite material 48 and the bottom to comprise an auxiliary coating 49 (e.g., low COF, adhesive, metal, DLG, or DLC). Both surfaces are smooth and planar.

Figure 6F:
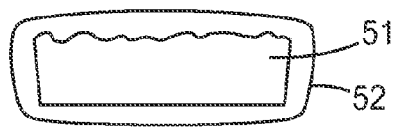
FIG. 6F is a side sectional view of a pillar sixth embodiment.

FIG. 6F is a side sectional view of a pillar sixth embodiment, composed of a sintered ceramic pillar body 51 encased in a glass containing coating 52. The pillar body is of type pillar 40 and is fully encased within a coating comprising a low melting point glass micropowder (frit), an optional inorganic nanoparticle, and a thermally decomposable thermoplastic binder. The surfaces are not necessarily smooth or planar. During the vacuum insulated glass unit fabrication process, the thermoplastic binder is removed via decomposition and the frit flows and wets the glass surface of one or both panes.

Figure 6G:
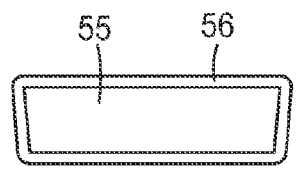
FIG. 6G is a side sectional of exemplary pillar with a functional coating.

FIG. 6G is a side sectional of exemplary pillar with a functional coating. In particular, a sintered ceramic body 55 is encased within functional coating 56.

Pillar Fabrication Processes

Figure 7:
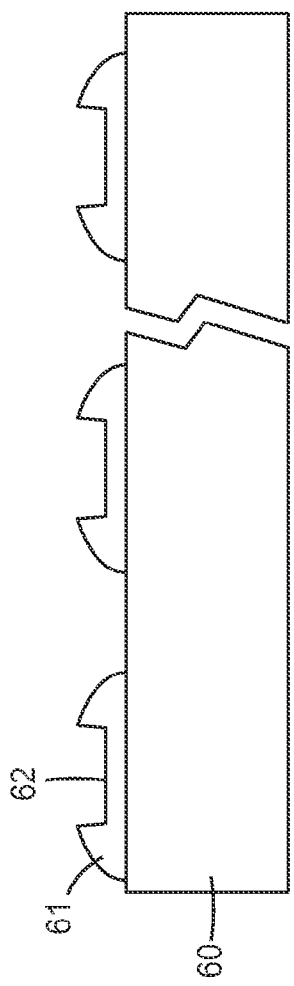
FIG. 7 is a side sectional view of pillar delivery film mold for the pillar first embodiment.

The pillars shown in FIG. 6A are cast as uncured resin formulations directly into a pillar delivery film mold. FIG. 7 is a side sectional view of pillar delivery film mold for the pillar first embodiment. The film mold includes a support film 60 and sacrificial thermoplastic resin molds 61 with cavities 62. Demolding does not occur until the pillars are transferred onto a glass pane surface. This film delivery design requires the lamination transfer of both the sacrificial mold and the molded composite. The sacrificial material is removed after the transfer by heating the glass substrate.

The spacing of the mold cavities on the pillar delivery film mold can be identical to the desired spacing on the vacuum insulated glass unit.

Figure 8:
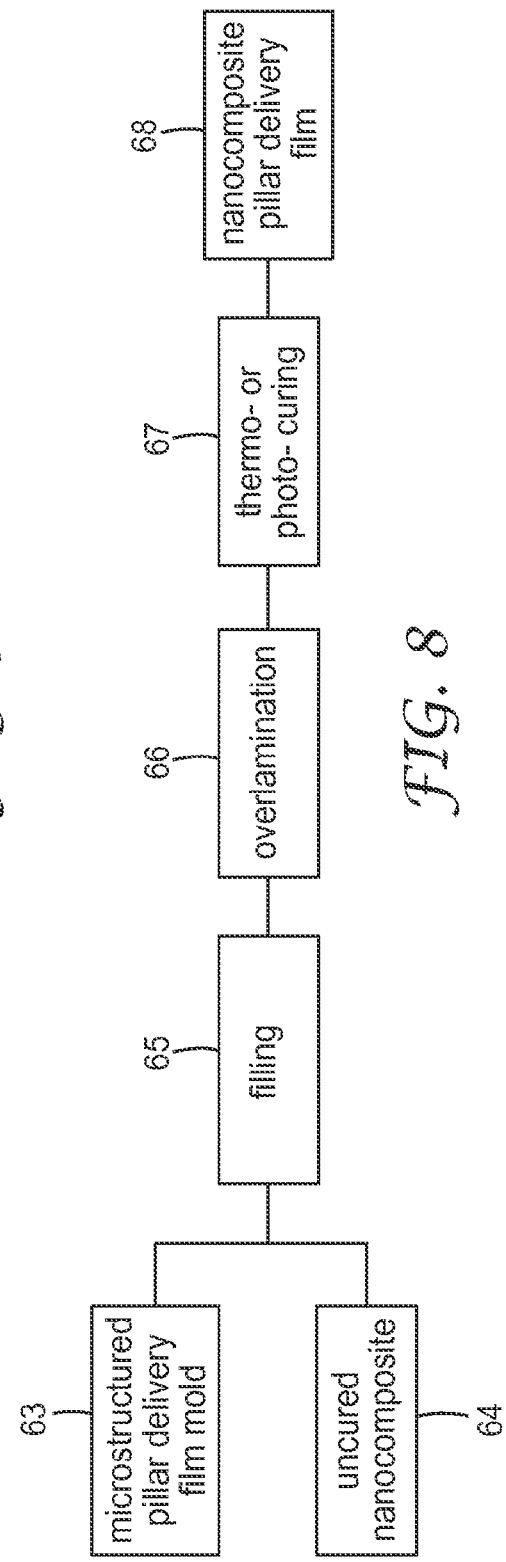
FIG. 8 is a diagram of a fabrication process for the first embodiment.

FIG. 8 is a diagram of a fabrication process for the pillar first embodiment. A resin 64 can be delivered into the mold cavities 63 by a nozzle, or by coating and doctoring off of excess material (step 65). The mold material is a sacrificial thermoplastic resin, which can be coated onto a support film uniformly, or as dots or patches in the mold cavity regions. Once the mold cavities are filled, an overlaminate film with a release surface (liner) is applied to smoothen and planarize the top surface of the resin (step 66). The resin is then cured in the mold (step 67) to form the nanocomposite pillar delivery film (step 68). Additional coatings (e.g., adhesives or lubricants) can be printed or coated at this stage by removing the liner.

Figure 9A:
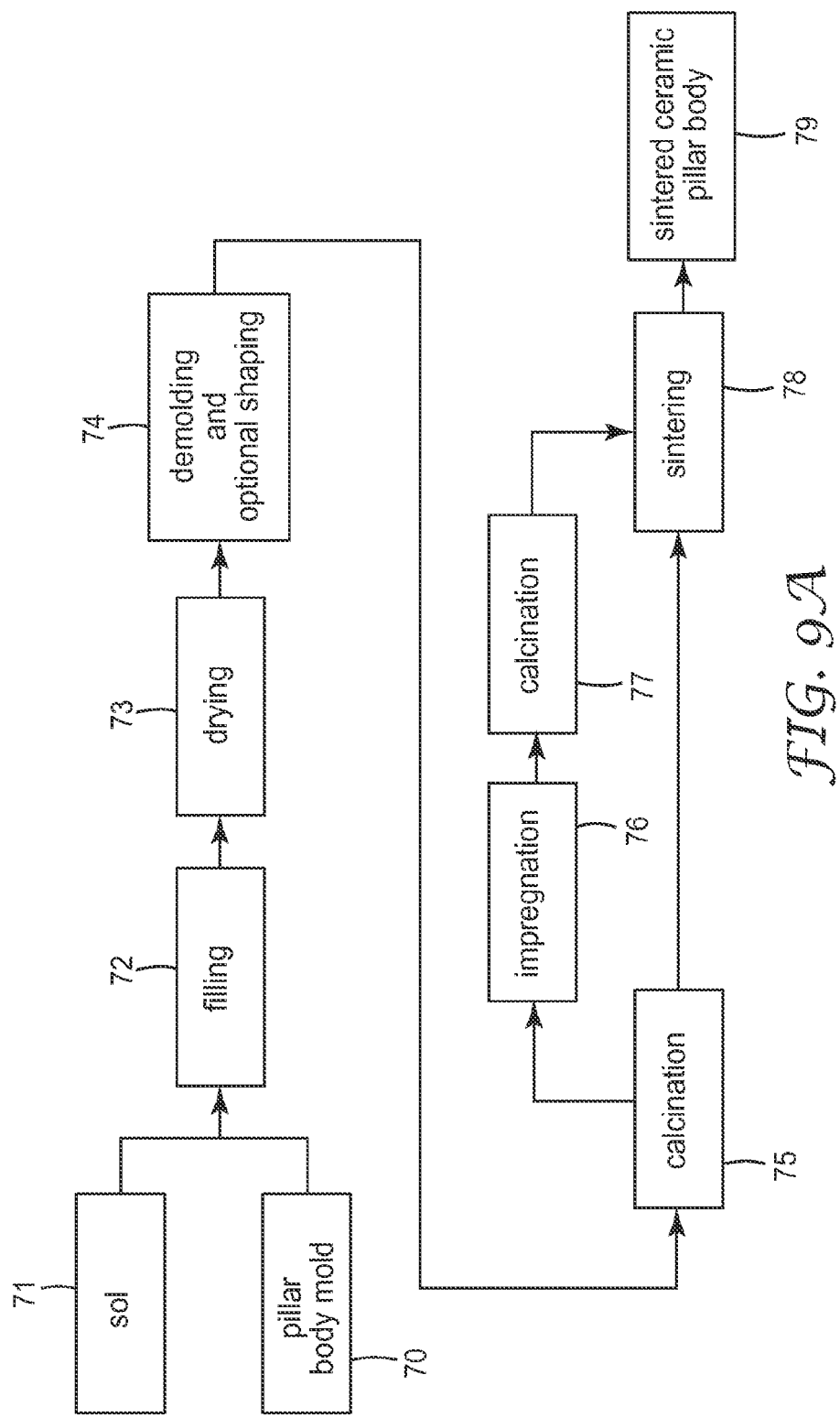
FIG. 9A is a diagram of a first fabrication process for the pillar second embodiment.

FIG. 9A is a diagram of a first fabrication process for the pillar second embodiment shown in FIG. 6B. Ceramic pillars are cast as sol gel precursors into a pillar body mold 70 using sol-gel material 71. The sol gel precursor consists of room temperature deionized water, boehmite, for example the alumina DIPERSAL product from Sasol, and nitric acid which is mixed with a high shear mixer for 15 minutes. The as-mixed formulation is allowed to gel for some time (2-24 hrs). The sol gel viscosity is a process parameter which is controlled by the composition and aging time. The release agent is generously applied to the pillar body mold and the sol gel is forced into the cavity of the mold by a knife coating process which is optimized to ensure good filing (step 72). The filling of tooling depends upon the coating material, coating method and coating process parameters. The as-coated mold is place in an oven at 230° F. and the sol gel is first dried to a predetermined moisture level (0-35%) (step 73) and then removed from the pillar body mold via a controlled process with optional shaping (step 74). The discrete pillars are then calcined (condensation and binder removal) and sintered (densification) at high temperatures in a rotary kiln (steps 75 and 78), resulting in a sintered ceramic pillar body (step 79). Step 75 can optionally include impregnation of the pillars with another material, for example to fill voids, and calcination of the combination (steps 76 and 77). The pillar body mold is designed to compensate for shrinkage of the sol gel during both heating steps.

Figure 9B:
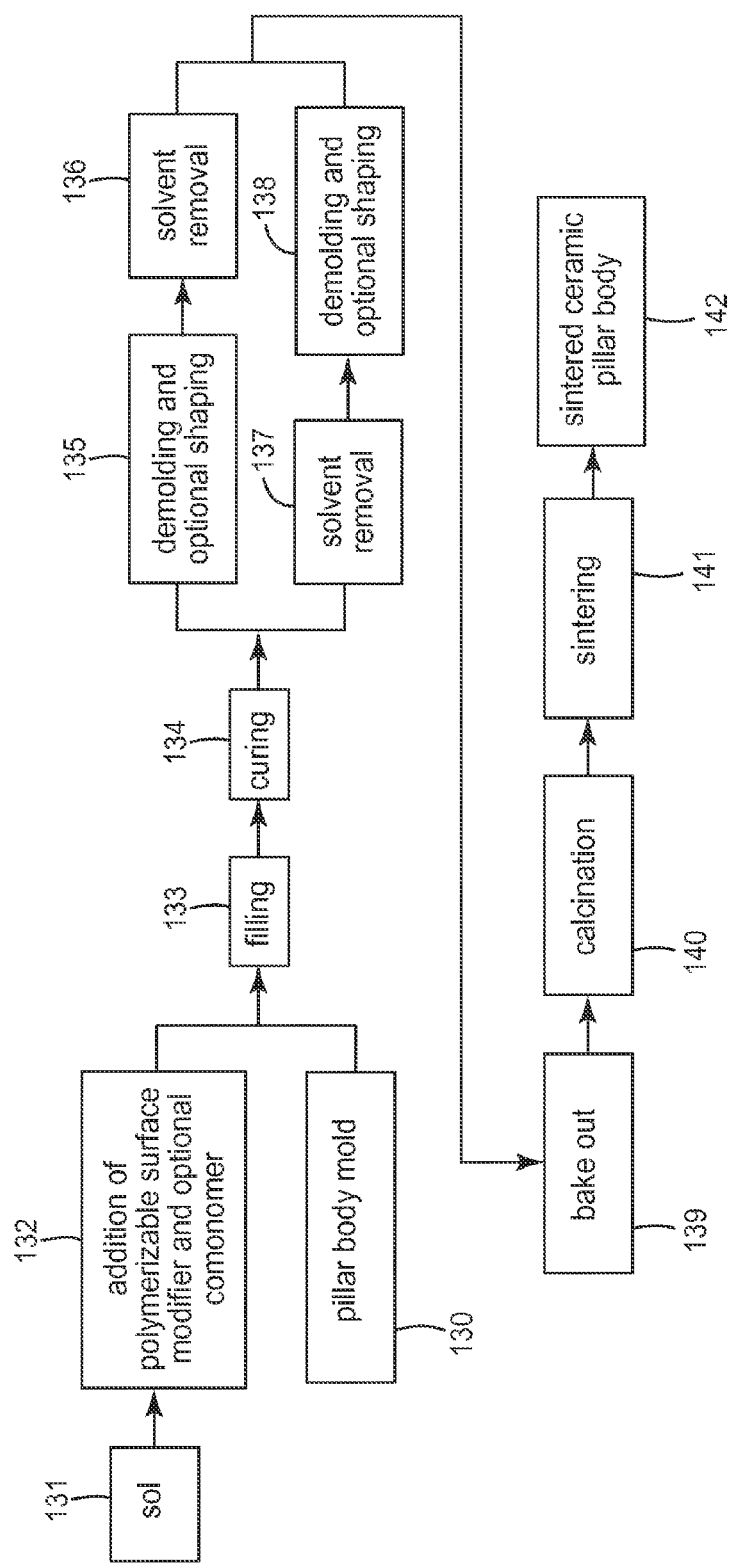
FIG. 9B is a diagram of a second fabrication process for the pillar second embodiment.

FIG. 9B is a diagram of a second fabrication process for the pillar second embodiment. Ceramic pillars are cast as sol gel precursors into a pillar body mold 130 using sol-gel material 131 with the addition of a polymerizable surface modifier and optional comonomer 132. The sol gel precursor consists of room temperature deionized water, boehmite, for example the alumina DIPERSAL product from Sasol, and nitric acid which is mixed with a high shear mixer for 15 minutes. The as-mixed formulation is allowed to gel for some time (2-24 hrs). The sol gel viscosity is a process parameter which is controlled by the composition and aging time. The release agent is generously applied to the pillar body mold and the sol gel is forced into the cavity of the mold by a knife coating process which is optimized to ensure good filing (step 133). The filling of tooling depends upon the coating material, coating method and coating process parameters. The as-coated mold is place in an oven at 230° F. and the sol gel is first dried to a predetermined moisture level (0-35%) (step 134) and then removed from the pillar body mold via a controlled process, which can include demolding with optional shaping and then solvent removal (steps 135 and 136) or solvent removal and then demolding with optional shaping (steps 137 and 138). The discrete pillars are then baked out, calcined (condensation and binder removal) and sintered (densification) at high temperatures in a rotary kiln (steps 139, 140, and 141), resulting in a sintered ceramic pillar body (step 142). The pillar body mold is designed to compensate for shrinkage of the sol gel during both heating steps.

Fabrication of the three pillar types shown in FIGS. 6C-6E involves inserting the ceramic bodies into pillar delivery film molds, which are larger than the ceramic pillar bodies.

Figure 10:
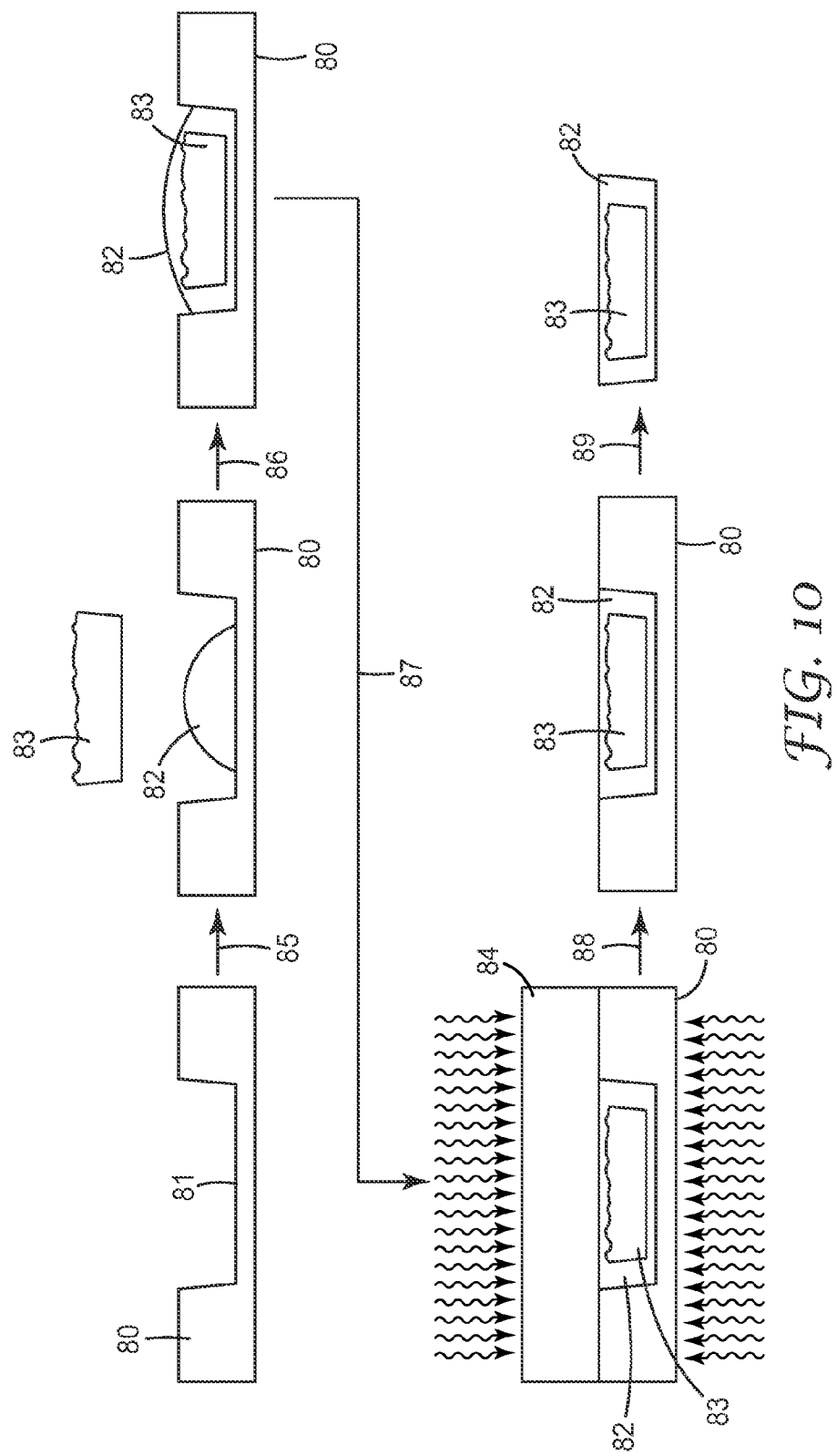
FIG. 10 is a diagram of a fabrication process for the pillar third embodiment.

FIG. 10 is a diagram of a fabrication process for the pillar shown in FIG. 6C. For these types of pillars, the film molds 80 with cavities 81 are pre-filled with a composite resin before the ceramic bodies 83 are inserted until they are encased by a material 82 (steps 85 and 86). The filled delivery film is overlaminated with a release liner 84 to planarize the top surface of the composite resin before thermal or radiation curing (step 87). The result is a delivery film with composite pillars (steps 88 and 89), each having smooth planar parallel major surfaces.

Figure 11:
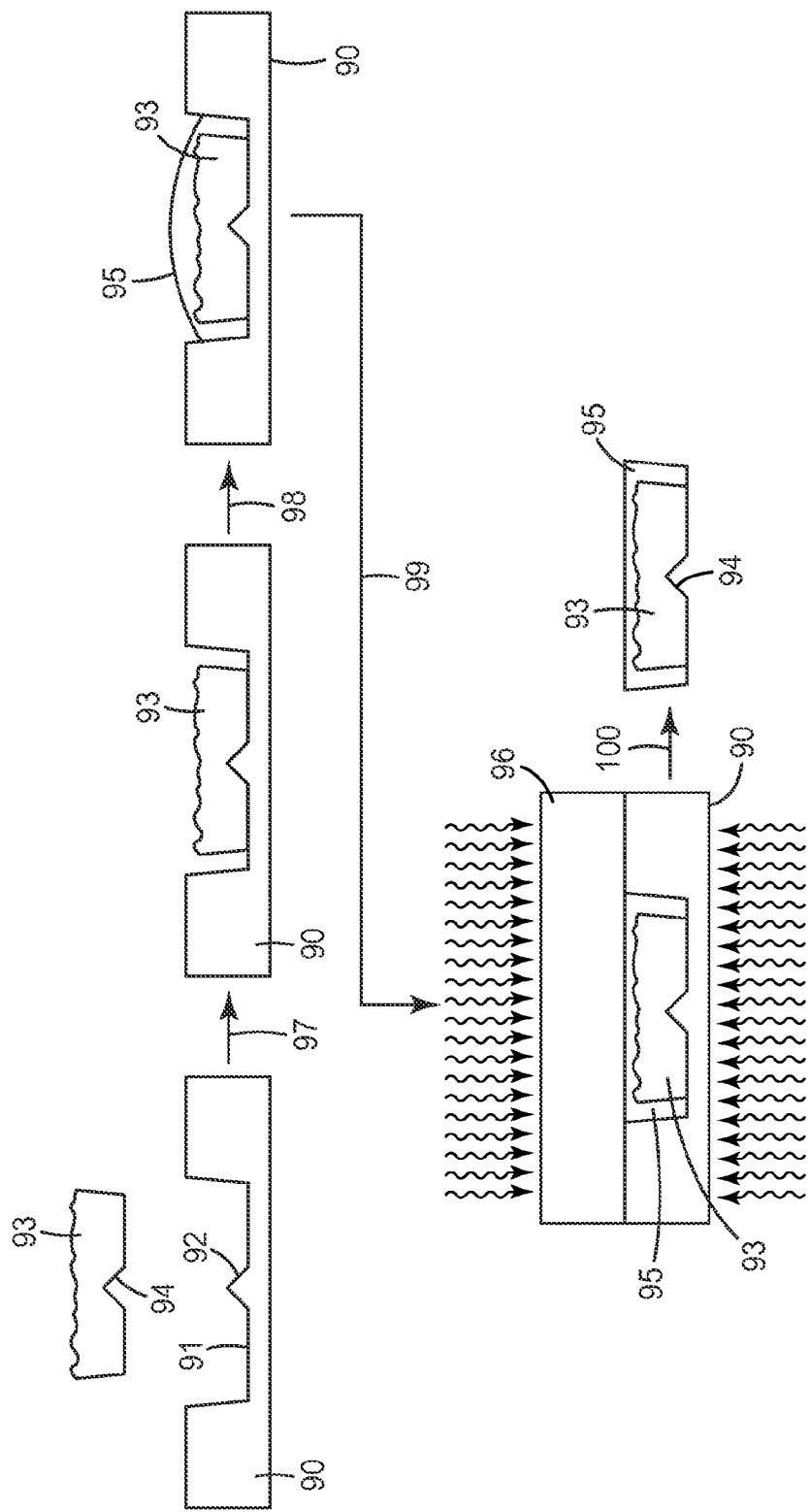
FIG. 11 is a diagram of a fabrication process for the pillar fourth embodiment.

FIG. 11 is a diagram of a fabrication process for the pillar shown in FIG. 6D. For these types of pillars, the film molds 90 with cavities 91 have a protrusion 92 that corresponds with an indentation 94 on the smooth mold side of the sintered ceramic bodies 93. The filling process is designed to selectively seat the sintered ceramic bodies in the mold cavities with the conical surfaces mated (step 97). The mold cavities with sintered ceramic bodies are then filled with composite resin 95 (step 98), overlaminated with a release liner 96, and cured as with the process shown in FIG. 10 (step 99). The result is a composite pillar with planar parallel major surfaces (step 100), one composed of sintered ceramic, the other of a composite.

Figure 12:
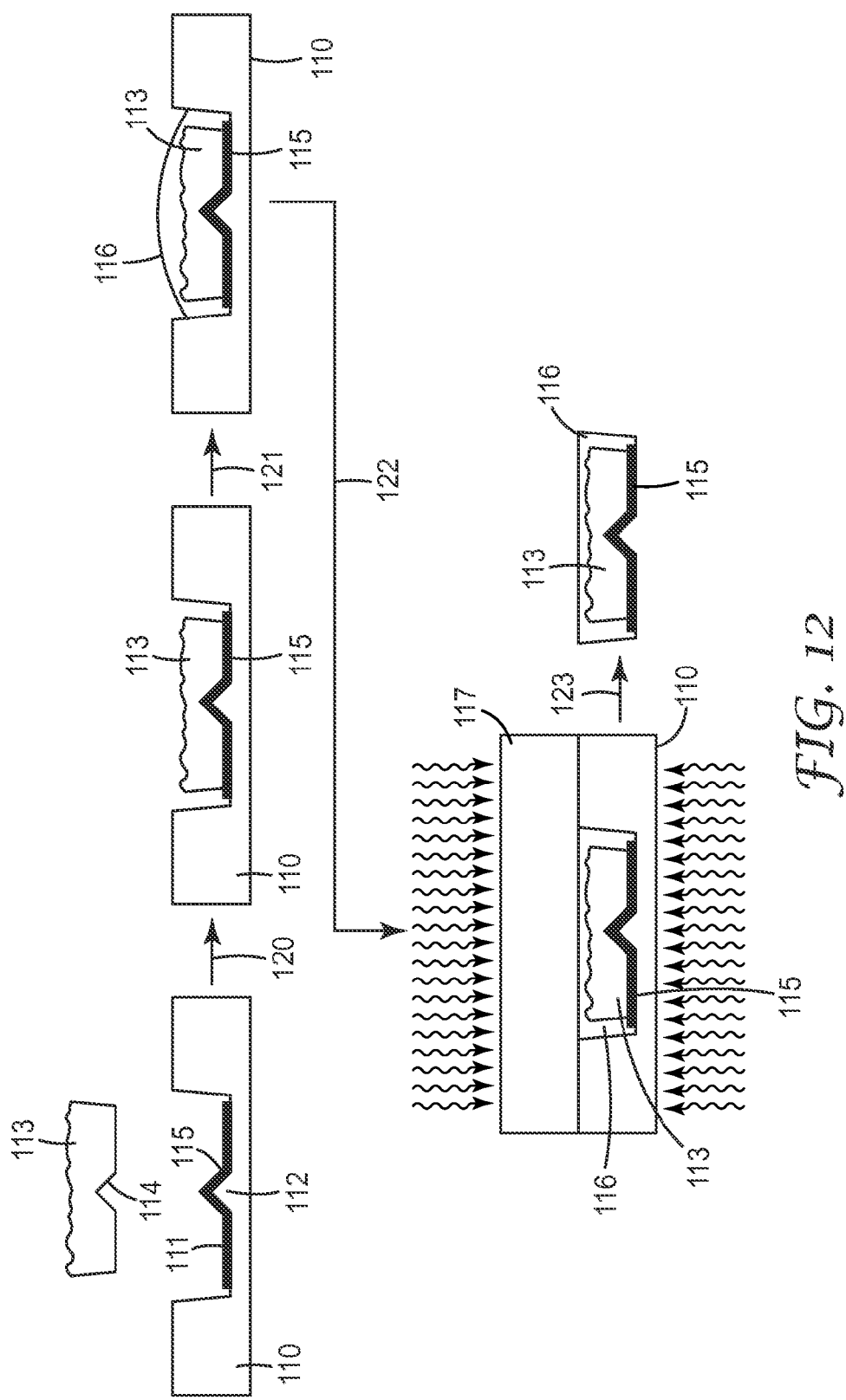
FIG. 12 is a diagram of a fabrication process for the pillar fifth embodiment.

FIG. 12 is a diagram of a fabrication process for the pillar shown in FIG. 6E. For these types of pillars, the film molds 110 with cavities 111 have a conical protrusion 112 that corresponds with an indentation 114 on the smooth mold side of the ceramic bodies 113 as with the type of pillars shown in FIG. 6D. The mold cavities are first coated with a thin film 115 via vacuum deposition, ink jet printing, screen printing, or the like. The cavities are then populated with the ceramic bodies (step 120), filled with a composite resin 116 (step 121), and overlaminated with a release liner 117 and cured (step 122) as with the process shown in FIG. 10. The result is a composite pillar with planar parallel major surfaces (step 123), one composed of ceramic, the other of a thin coated material.

The pillars shown in FIG. 6F are encapsulated in a thin dispersion of low melting glass frit powder and a sacrificial thermoplastic binder. The coating can be done in solution or by spray coating in a fluidized bed. The coated pillars are dried to remove solvent.

In the fabrication processes described above, additional or supplemental steps can be used within the described steps. In some of the side sectional views of the fabrication processes described above, only one mold and corresponding pillar are shown for illustrative purposes only. These processes typically include many of the molds and pillars for making pillars for delivery to vacuum insulated glass units. Examples of other materials for use in making pillars are disclosed in PCT Patent Application Publication No. WO 2013/0055432, which is incorporated herein by reference as if fully set forth.

In some embodiments, a plurality of pillars can be made to be substantially similar using the processes, pillar configurations, and materials described herein. For example, 1000 or more pillars can be made having pillar bodies with a standard deviation along their cross sections of less than 5%.

EXAMPLES

Example 1: Pillar First Embodiment (FIG. 6A)

The FILTEK Supreme Plus product (3M Company, St. Paul, Minn.), a silica and zirconia nanoparticle filled meth-acrylate resin, was knife coated between a polymer tool and a sheet of 2 mil unprimed PET. The sample was crosslinked through the PET using 4 passes of ultraviolet irradiation (RPC Industries UV Processor QC 120233AN/DR, Plainfield, Ill.) at 50 fpm in air. The PET was removed and the cured pillars were released from the polymer tool by flexing the tool in a tight radius. Confocal microscope surface analysis of the UV cured nanocomposite showed the surface of this pillar as smooth (Ra~500 nm) and showed this pillar as flat with a variation in height across the entire pillar of +/−1 µm.

Example 2: Pillar Second Embodiment (FIG. 6B)

Sintered $Al_2O_3$ Pillar Body.

A sample of boehmite sol-gel was made using the following recipe: aluminum oxide monohydrate powder (1600 parts) having the trade designation "DISPERAL" was dispersed by high shear mixing a solution containing water (2400 parts) and 70% aqueous nitric acid (72 parts) for approximately 15 minutes. The resulting sol-gel was aged for at least 1 hour before coating. The sol-gel was forced into the triangular shaped cavities of a polymer mold with a putty knife so the cavities were completely filled. The cavities have of depth of approximately 250 µm and are 1 mm on each side. The draft angle, α, between the sidewall and bottom of the mold was 8°. Prior to filling the mold with the sol-gel, a mold release agent was coated onto the mold and then the excess methanol was removed by heating in an oven at 45° C. for 5 minutes. The sol-gel filled mold was placed in an air convection oven at 45° C. for at least 45 minutes to dry. The shaped parts were removed from the mold by flexing it in a tight radius and the pillar bodies were then calcined at approximately 650° C. and saturated with a nitrate solution of the following concentration (reported as oxides): 1.8% MgO. The excess nitrate solution was removed and the saturated pillar bodies were allowed to dry after which the particle were again calcined at 650° C. and then sintered at approximately 1400° C. Both the calcining and sintering were performed using rotary tube kilns.

Confocal microscope surface analysis of the sintered $Al_2O_3$ pillar body showed the tool side surface of this pillar as smoother (Ra~1.1 µm) than the air side surface (Ra~3.6 µm) and showed this pillar as cupped with a variation in height across entire pillar surface of +8/−2 µm.

Example 3: Pillar Third Embodiment (FIG. 6C)

A polymer tool with triangular cavities having a of depth of approximately 250 µm, 1 mm on each side and a draft angle of 8° was filled with the FILTEK Supreme Plus product and individual sintered $Al_2O_3$ pillar bodies from Example 2 were pressed into the resin. The excess resin was scraped off the tool, a piece of 2 mil unprimed PET was placed on top of the filled tool and the sample was crosslinked through the PET using 4 passes of ultraviolet irradiation (RPC Industries UV Processor QC 120233AN/DR, Plainfield, Ill.) at 50 fpm in air. The encapsulated and planarized pillars were released from the polymer tool by flexing the tool in a tight radius. A light microscope image at 50× of this coated, planarized pillar showed the pillar to appear as a light core surrounded by opaque nanoparticle resin.

Example 4: Pillar Fourth Embodiment (FIG. 6D)

The FILTEK Supreme Plus product was applied drop wise to 2 mil unprimed PET and individual type sintered $Al_2O_3$ pillar bodies from Example 2 were pressed into the resin. The sample was crosslinked using 4 passes of ultraviolet irradiation (RPC Industries UV Processor QC 120233AN/DR, Plainfield, Ill.) at 50 fpm in air. Any excess resin surrounding the pillars was removed using a razor blade. The planarized pillars were released from the PET by flexing it in a tight radius. A light microscope image at 50× of this coated, planarized pillar showed the pillar to appear as a light core with an opaque nanoparticle resin planarizing one surface.

Example 5: Pillar Third Embodiment (FIG. 6C)

Acrylo POSS (Polyhedral Oligomeric Silsesquioxane) Solution:

A resin premix was made by adding 10 grams Acrylo POSS MA0736 (Hybrid Plastics, Inc., 55 WL Runnels Industrial Drive, Hattiesburg, Pa. 39401) and 0.1 grams Irgacure 1173 (BASF Corporation, 11501 Steele Creek Road, Charlotte, N.C. 28273) to a 40 ml vial. The premix was mixed for about 30 minute to ensure that the photoinitiator was completely dissolved.

Silica/Zirconia Microparticle Powder:

1,065.6 grams of a 31 weight percent colloidal silica aquasol (37 Ludox LS", commercially available from W.R. Grace & Co. Columbia, Md., USA) was acidified by the addition of 11 grams of concentrated nitric acid, diluted 1:1 with deionized water, and filtered through 2 micro fine filters placed in series. The first microfine filter was a "Ballston grade B" filter having a pore diameter of 2 micrometers, and the second microfine filter was a "Ballston grade AA" filter having a pore diameter of 0.25 micrometers. 492.8 Grams of aqueous zirconyl acetate (containing 25 weight percent equivalent $ZrO_2$) was similarly diluted and filtered. The aqueous zirconyl acetate was placed in a glass beaker and stirred with a nylon blade mounted on a glass rod and rotated by an air stirrer motor. The colloidal silica aquasol was poured slowly into the vortex formed in the stirred aqueous zirconyl acetate, to provide a mixture containing an equivalent $SiO_2:ZrO_2$ molar ratio of 5.5:1. The resulting mixture was stirred for 15 minutes, then, spray dried to form a weakly agglomerated powder. This powder was then ball milled for a total milling time of 45 minutes in a ceramic mill jar containing 12 millimeter diameter by 12 millimeter long ceramic rod media.

The milled powder was placed in rectangular vitreous silica saggers at a depth of about 19 millimeters and heated in a muffle furnace for 16 hours at 400° C. The temperature of the muffle furnace was then raised 100° C. every half hour. Following one half hour at 900° C., the temperature of the muffle furnace was raised to 950° C. for one hour and 1000° C. for three hours. The saggers were removed from the muffle furnace and allowed to cool in air. The resulting fired powder was weakly agglomerated and white in appearance. It was milled for 5 to 15 minutes in the ceramic ball mill described above. The milled powder had a bimodal distribution of particles with the large particles ranging from 1-2 microns and the small particles ranging from 100-300 nanometers as measured by intensity of dynamic light scattering.

The milled powder was silane-treated by slurrying 100 grams of the powder with 200 milliliters of cyclohexane for 30 minutes. A mixture of 7.5 grams of gamma-methacryloxypropyl trimethoxysilane (commercially available from Alfa Aesar Ward Hill, Mass., USA) and two grams n-propyl amine was added to the slurry. Mixing was allowed to continue for one hour. The slurry was then spray dried to remove the cyclohexane resulting in silane treated silica/Zirconia microparticles.

Acrylo POSS Silica/ZrO2 Powder Solution:

2.0 grams of silane-treated silica/$ZrO_2$ powder and 0.5 grams of the Acrylo POSS Solution were added to a PET vial. The mixture was agitated in a planetary mixer (Thinky Corporation, model AR-250, Osaka, Japan) for two cycles of 2 minutes each to form a homogeneous mixture.

Coated Pillar:

A polymer tool with triangular cavities having a of depth of approximately 250 μm, 1 mm on each side and a draft angle of 8° was filled with the Acrylo POSS Silica/Zirconia resin mixture, and individual sintered $Al_2O_3$ pillar bodies from Example 2 were pressed into the resin. The excess resin was scraped off the tool, a piece of 2 mil unprimed PET was placed on top of the filled tool and the sample was crosslinked through the PET using 4 passes of ultraviolet irradiation (RPC Industries UV Processor QC 120233AN/DR, Plainfield, Ill.) at 50 fpm in air. The encapsulated and planarized pillars were released from the polymer tool by flexing the tool in a tight radius.

Example 6: Pillar Sixth Embodiment (FIG. 6F)

A glass frit/silica nanoparticle containing resin was formulated by mixing the following ingredients in a planetary mixer (Thinky Corporation, model AR-250, Osaka, Japan): 0.97 grams urethane acrylate oligomer GX-8755A (available from Dai-ichi Kogyo Seiyaku, Kyoto, Japan), 1.0 gram tripropylene glycol n-butyl ether (Sigma-Aldrich St. Louis, Mo., USA), 0.4 grams Disperbyk-111 (available from BYK USA, Wallingford, Conn.), 0.3 grams Lucirin TPO (BASF Florham Park, N.J., USA), 7 grams Ferro 2934 glass frit (Ferro Corporation, Cleveland, Ohio, USA), and 1 gram of silane-treated silica/ZrO2 powder. The resin was mixed for 2 cycles of 2 minutes each to form a homogenous mixture.

A polymer tool with triangular cavities having a of depth of approximately 250 μm, 1 mm on each side and a draft angle of 8° was filled with the glass frit resin mixture and individual sintered $Al_2O_3$ pillar bodies from Example 2 were pressed into the resin. The excess resin was scraped off the tool, a piece of 2 mil unprimed PET was placed on top of the filled tool and the sample was crosslinked through the PET using 4 passes of ultraviolet irradiation (RPC Industries UV Processor QC 120233AN/DR, Plainfield, Ill.) at 50 fpm in air. The encapsulated and planarized pillars were released from the polymer tool by flexing the tool in a tight radius.

Example 7: Pillar Third Embodiment (FIG. 6C)

Si/Zr Resin Formulation:

2.0 grams of silane treated silica/zirconia powder and 0.2 grams of Lucirin TPO (BASF Florham Park, N.J., USA) where added to 12 grams of bismaleimide BMI-1700 (Designer Molecules, San Diego, Calif., USA) and mixed at 3000 rpm for 1 minute in a SpeedMixer (FlackTek Inc, Landrum, S.C., USA).

Coated Pillar:

A polymer tool with triangular cavities having a of depth of approximately 250 μm, 1 mm on each side and a draft angle of 8° was filled with the Silica/Zirconia resin mixture that had been heated in an oven for 10-15 minutes at 100 degrees C. Individual sintered $Al_2O_3$ pillar bodies from Example 2 were pressed into the resin while it was still warm. The excess resin was scraped off the tool, a piece of 2 mil unprimed PET was placed on top of the filled tool and the sample was crosslinked through the PET using 4 passes of ultraviolet irradiation (RPC Industries UV Processor QC 120233AN/DR, Plainfield, Ill.) at 50 fpm in air. The encapsulated and planarized pillars were released from the polymer tool by flexing the tool in a tight radius.

Example 8: Pillar Third Embodiment (FIG. 6C)

Si/Zr/PTFE Resin Formulation:

1.0 gram of silane treated silica/zirconia powder, 1.0 gram PTFE beads (Micropowders, Inc. Tarrytown, N.J., USA), and 0.2 grams of Lucirin TPO (BASF Florham Park, N.J., USA) where added to 12 grams of bismaleimide BMI-1700 (Designer Molecules, San Diego, Calif., USA) and mixed at 3000 rpm for 1 minute in a SpeedMixer (FlackTek Inc, Landrum, S.C., USA).

Coated Pillar:

A polymer tool with triangular cavities having a of depth of approximately 250 μm, 1 mm on each side and a draft angle of 8° was filled with the Si/Zr/PTFE resin mixture that had been heated in an oven for 10-15 minutes at 100 degrees C. Individual sintered $Al_2O_3$ pillar bodies from Example 2 were pressed into the resin while it was still warm. The excess resin was scraped off the tool, a piece of 2 mil unprimed PET was placed on top of the filled tool and the sample was crosslinked through the PET using 4 passes of ultraviolet irradiation (RPC Industries UV Processor QC 120233AN/DR, Plainfield, Ill.) at 50 fpm in air. The encapsulated and planarized pillars were released from the polymer tool by flexing the tool in a tight radius.

Example 9: $ZrO_2$ Pillar

Sol Preparation Procedure
Hydrothermal Reactor

The reactor was prepared from 50 feet (15 meters) of Stainless Steel Braided Smooth Tube Hose (DuPont T62 Chemfluor PTFE, 0.25 inch I.D., 0.065 inch thick wall tubing available from Saint-Gobain Performance Plastics, Beaverton, Mich.). This tube was immersed in a bath of peanut oil heated to the desired temperature. Following the reactor tube, a coil of an additional 10 feet (3 meters) of Stainless Steel Braided Smooth Tube Hose (DuPont T62 Chemfluor PTFE, 0.25 inch inner diameter, 0.065 inch thick wall plus 10 feet (3 meters) of 0.25 inch stainless-steel tubing with a diameter of 0.25 inch (0.64 cm) and wall thickness of 0.035 inch (0.089 cm) that was immersed in an ice-water bath to cool the material and a backpressure regulator valve was used to maintain an exit pressure of 400 psi (pounds per square inch).

Sol Compositions are Reported in Mole Percent Inorganic Oxide.

Sol Preparatory
$ZrO_2/Y_2O_3/La_2O_3$ (93.5/5.0/1.5) Sol

A precursor solution was prepared by combining the zirconium acetate solution (2,000 grams) with DI water (1680 grams). Yttrium acetate (126.46 grams) and Lanthanum acetate (18.62 grams) were added and mixed until fully dissolved. The solids content of the resulting solution was measured gravimetrically (120 C/1 hr forced air oven) to be 21.6 wt %. D.I. water (517 grams) was added to adjust the final concentration to 19 wt %. This procedure was repeated four times to give a total of approximately 17,368 grams of precursor material. The resulting solution was pumped at a rate of 11.48 ml/min. through the hydrothermal reactor. The temperature was 225° C. and the average residence time was 42 minutes. A clear and stable zirconia sol was obtained.

Sol Diafiltration and Concentration Procedure

The as prepared sol was concentrated (20-35 wt % solids) via ultrafiltration using a membrane cartridge (M21S-100-01P available from SpectrumLabs; 18617 Broadwick St. Rancho Dominguez, Calif. 90220). The final composition was adjusted via diafiltration, ultrafiltration and or distillation. The final composition of the sol was 49.184% solids, 2.36 mmole Acetic acid/g ZrO2, ETOH/water ratio was 68/32.

Gel Preparation Procedure

The above sol (2087.7 g) was charged to a large jar. Acrylic acid (95.04 g) and HEMA (48.68 g) were charged to the sol with stirring. Vazo 67 (4.95 g) was dissolved in ethanol (51.14 g) and charged to the sol with stirring.

Sol Casting

The Sol (93.5 mol % $ZrO_2$/5 mol % $Y_2O_3$/1.5 mol % $La_2O_3$, 0.05 wt % Irgacure 819, HEMA) was cast into a polypropylene triangle sheet mold using a pipette to deliver the sol. The mold consists of arrays of equilateral triangles with 5 mm long sides and a cavity depth of 2 mm. This was done in an area equipped with yellow lights. A glass plate coated with a thin layer of Stoner Mold Release was laid on to the sol filled mold and clamped in place. The sol was cured for 2 min. using a 460 nm LED light bank. After curing the triangles released from the mold, but stuck to the glass plate. A thin glass cover slide was used to get between the triangle gel pieces and the glass and gently remove the triangle gel pieces. These pieces were placed in an aluminum pan and left in open air to dry to xerogels. These xerogel triangles were burned out and pre-sintered as follows:

Organic Removal by Thermal Means

Set triangles on a bed of zirconia beads in an alumina crucible, cover with alumina fiberboard then fire in air according to the following schedule:

1—Heat from 20° C. to 220° C. at 18° C./hr rate,
2—Heat from 220° C. to 244° C. at 1° C./hr rate,
3—Heat from 244° C. to 400° C. at 6° C./hr rate,
4—Heat from 400° C. to 1090° C. at 60° C./hr rate,
5—Cool from 1090° C. to 20° C. at 120° C./hr rate, The pre-sintered triangles were then sintered as follows:

Sintering Process

Set triangles on a bed of zirconia beads in an alumina crucible, covered with alumina fiberboard then sinter in air according to the following schedule:

1—Heat from 20° C. to 1020° C. at 600° C./hr rate,
2—Heat from 1020° C. to 1267° C. at 120° C./hr rate,
3—Hold at 1267° C. for 2 hr.
3—Cool down from 1267° C. to 20° C. at 600° C./hr rate.

Confocal microscope surface analysis of the sintered $ZrO_2$ pillar body showed the tool side surface of this pillar had a roughness (Ra~1.1 µm) and the air side was (Ra<1 µm), and the pillar visually appeared translucent. This pillar had a maximum variation in height across entire pillar surface of +2/−2 µm with the top and bottom surface essentially parallel.

Compression Strength of Sintered $Al_2O_3$ and $ZrO_2$ pillar bodies were measured using an Instron Model 5500R and ASTM standard C1424-10: Monotonic Compressive Strength of Advanced Ceramics at Ambient Temperature. Results are provided in the following Table.

| Sample | Average Max Load (N) | Average Area (mm²) | Average Compression Strength (Pa) |
|---|---|---|---|
| Sintered $Al_2O_3$ pillar body (Example 2) | 211.5 | 0.120 | 1.76E+09 |
| Sintered $ZrO_2$ pillar body (Example 9) | 2290 | 1.540 | 1.49E+09 |

The invention claimed is:

1. A pillar for use in a vacuum insulated glass unit, comprising:
   a body comprising sintered ceramic, alpha alumina, or zirconia; and
   a functional layer on at least a portion of the body,
   wherein the largest dimension of the pillar is equal to or less than 600 microns, and a compressive strength of the pillar is equal to or greater than 400 MPa,
   wherein the body has a tapered sidewall with a draft angle between 95° and 100°; and
   wherein the functional layer comprises a compliant planarization layer including a compliant layer polymeric binder comprising siloxane, silsesquioxane or alkoxysilane.

2. The pillar of claim 1, wherein the body has a 6-, 8-, or 12-sided shape.

3. The pillar of claim 1, wherein the body has a round shape.

4. The pillar of claim 1, wherein the functional layer comprises a compliant layer comprising inorganic nanoparticles.

5. The pillar of claim 1, further comprising an indentation within a surface of the body.

6. The pillar of claim 5, wherein the indentation is a central conical indentation.

7. The pillar of claim 5, further comprising a notch extending laterally from the indentation and through the sidewall of the body.

8. The pillar of claim 1, wherein the siloxane is an amorphous organopolysiloxane network.

9. A pillar for use in a vacuum insulated glass unit, comprising:
   a body comprising sintered ceramic, alpha alumina, or zirconia, the body comprising:
      a first face and an opposite second face and a tapered side wall between the first and second faces;
      a conical indentation disposed at a central area of one of the first and second faces; and
      a notch extending laterally from the conical indentation and through the side wall; and
   a functional layer on at least a portion of the body, the functional layer comprising a compliant planarization layer including a compliant layer polymeric binder comprising siloxane, silsesquioxane or alkoxysilane,
   wherein the largest dimension of the pillar is equal to or less than 600 microns, and a compressive strength of the pillar is equal to or greater than 400 MPa.

* * * * *